United States Patent [19]

Warden

[11] Patent Number: 5,184,444
[45] Date of Patent: Feb. 9, 1993

[54] SURVIVABLE DEPLOYABLE/RETRACTABLE MAST

[75] Inventor: Robert M. Warden, Santa Barbara, Calif.

[73] Assignee: AEC-Able Engineering Co., Inc., Goleta, Calif.

[21] Appl. No.: 743,522

[22] Filed: Aug. 9, 1991

[51] Int. Cl.⁵ ............................................. E04H 12/18
[52] U.S. Cl. ...................................... 52/646; 52/108; 52/118
[58] Field of Search ............... 52/108, 111, 645, 646, 52/647, 117, 118

[56] References Cited

U.S. PATENT DOCUMENTS

| | | | |
|---|---|---|---|
| 4,480,415 | 11/1984 | Truss | 52/108 |
| 4,569,176 | 2/1986 | Hedgepeth et al. | 52/645 |
| 4,575,975 | 3/1986 | Eisenberg | 52/646 |
| 4,578,919 | 4/1986 | Amadon et al. | 52/108 |
| 4,599,832 | 7/1986 | Benton et al. | 52/646 |
| 4,655,022 | 4/1987 | Natori | 52/108 |
| 4,677,803 | 7/1987 | Mikulas, Jr. et al. | 52/646 |
| 5,016,418 | 5/1991 | Rhodes et al. | 52/646 |
| 5,085,018 | 2/1992 | Kitamura et al. | 52/646 |

Primary Examiner—Richard E. Chilcot, Jr.
Assistant Examiner—Michele A. Van Patten
Attorney, Agent, or Firm—Donald D. Mon

[57] ABSTRACT

A mast which is retractable to a lesser height and volume, and deployable to a greater height, and which when deployed can survive a very high temperature event. All structural elements which are required for structural integrity while the mast is deployed are rigid members made of high temperature resistant material. Where the ends of structural diagonals must move toward one another during retraction, that diagonal is provided as a rigid body of two relatively sliding parts which can be latched in an extended condition when the mast is deployed. A lanyard is provided for unlatching and retraction purposes, which may be sacrificed to a high temperature event.

9 Claims, 6 Drawing Sheets

SURVIVABLE DEPLOYABLE/RETRACTABLE MAST

FIELD OF THE INVENTION

This invention relates to masts which in their retractable configuration can be stored in a lesser volume, and are extendible to an elongated deployed configuration. It further relates to such masts which when in the deployed configuration can survive very high temperatures.

BACKGROUND OF THE INVENTION

Structures which in their installed configuration have substantial lengths of elongation are often referred to as a mast. Classical examples are masts to support antenna, solar panels, reflectors, and the like. The utility of such structures goes far beyond these uses. Other examples are for keels, spines, and spans. All such applications are referred to herein as "masts".

A pervasive problem with masts is that the dimension of their deployed or elongated configuration makes the mast almost impossible to transport in that configuration. For many land-based applications the solution is quite simple. The mast is provided as a group of individual parts which are joined together at the site.

There are many applications where this solution is not appropriate, because the total bulk takes up too much volume. This is especially true for space-borne equipment and battle field antenna.

To overcome this problem, numerous arrangements have been proposed in which for storage and transport the mast is pulled into its retracted configuration, which occupies a relatively small volume and has a much reduced axial length. It is released from its retracted configuration and in one way or another is caused to extend to its deployed configuration. This available change in bulk volume and axial length enables a long mast to be carried in a small cannister, and to be deployed only when needed.

Attempts have been made to make masts both deployable and retractable, and many of these have been quite acceptable. However, masts of this type when deployed include three or more longerons, often a number of brace members, and always a number of diagonal members to hold the longerons and brace members in an assembled condition. This situation has been faced and to a degree settled by making some parts flexible, especially the diagonals. Also, in some devices the longerons are flexible and continuous, and are stored in a coiled condition. Some rigid members are provided, but in any event the whole assembly is not made up of rigid members. In other applications, the longerons may be jointed together. In both situations it is usual to provide diagonal members in each bay which bay is bounded by two longerons which are flexible.

Again, for many installations these previous efforts are fully suitable. However, flexibility of material generally involves the complication that it will be insufficiently resistive to very high temperatures such as may be imposed under untoward and unusual situations, and the flexible material will not be sufficiently survivable. The consequence is that in such an event, a deployed mast could be disabled by the destruction of its flexible members.

The problem remains to provide a mast which is readily deployable and retractable to about 15% of its deployed length, but which while deployed can withstand extraordinary temperatures as high as 4,500 degrees F. and survive as a viable structure. This invention provides these advantages, using only rigid structural elements, except that after the untoward event it will no longer be retractable. Still it will function for its intended deployed purpose. Under the circumstances this is all that can be expected. All the while, until that event, the mast will enjoy as much retractability and deployability as masts which must incorporate less resistive flexible components.

BRIEF DESCRIPTION OF THE INVENTION

A mast according to this invention has a base to which four longerons are engaged. The longerons are provided in rigid segments which are pivotally joined together in pairs at sequential bays. At each bay there is a rigid square frame whose square frame segments connect with the longerons so as precisely to space them apart.

A rigid N frame segment is rigidly attached between the longerons of a first pair of two opposite bays defined between longeron segments and the square frames to form diagonal stiffeners for two faces of these bays so the other two faces are duplexed and change their shape simultaneously.

According to a feature of this invention, a slider is slidable along opposite square frame segments adjacent to the other pair of bays. These sliders are provided at every other bay. The sliders are pivotally joined at one of their ends by rigid diagonals. The other ends of these diagonals are pivotally joined to the longerons at the next bays. The slider acts as an umbrella type movement which can slide along its respective square frame segment.

A latch is provided on the square frame segment to engage the slider when the mast is deployed, thereby rigidifying the deployed structure. A latch release means is provided in the respective square frame segment which can be moved to release the latch by a lanyard provided for this purpose.

According to this invention, all segments and fittings are rigid and made of material which can survive high temperatures. The composite material known as carbon-carbon is the preferred material.

The above and other features of this invention will be fully understood from the following detailed description and the accompanying drawings, in which:

DETAILED DESCRIPTION OF THE INVENTION

Figure 1:
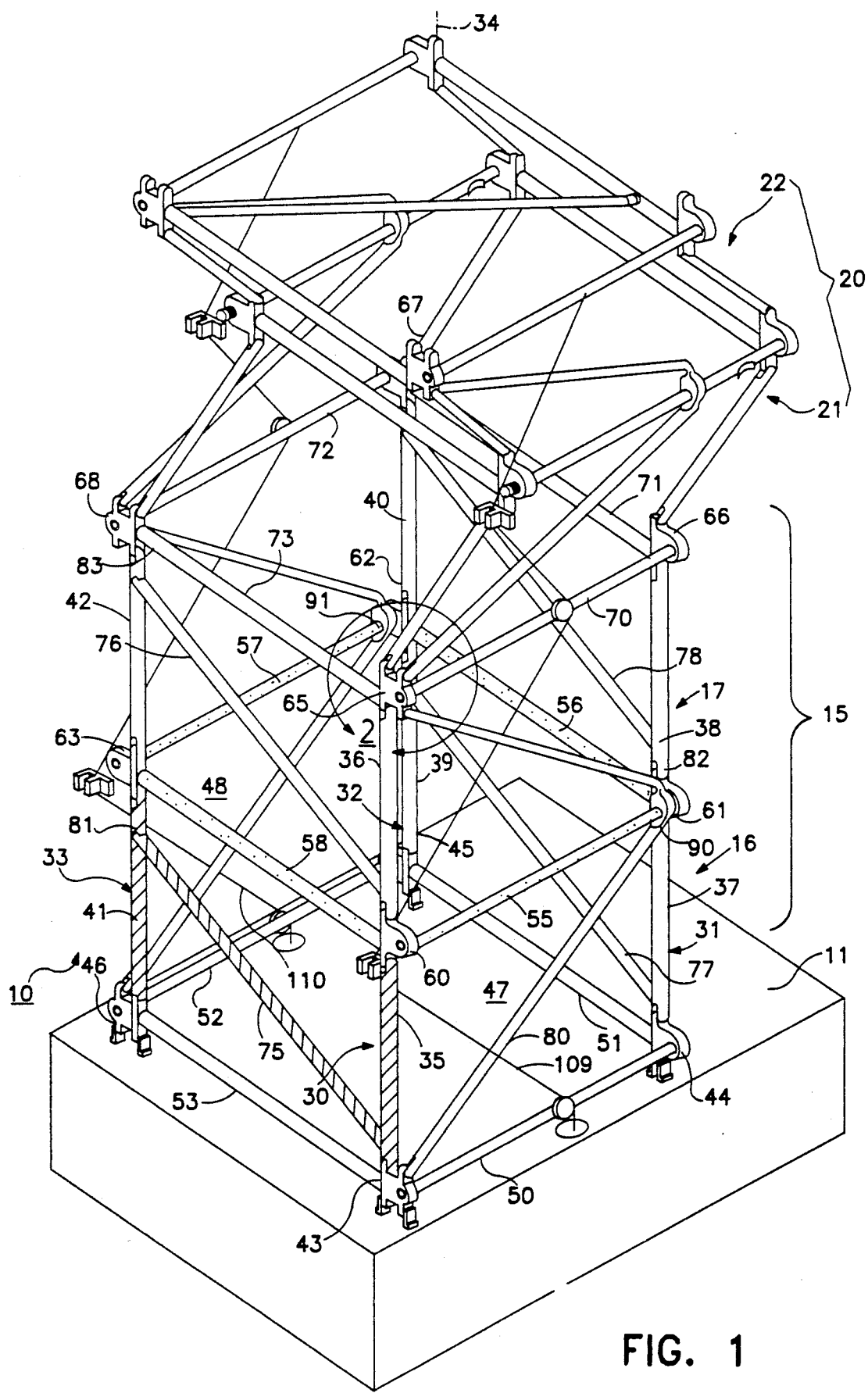
FIG. 1 is a perspective view showing the preferred embodiment of the invention partially deployed.
Figure 2:
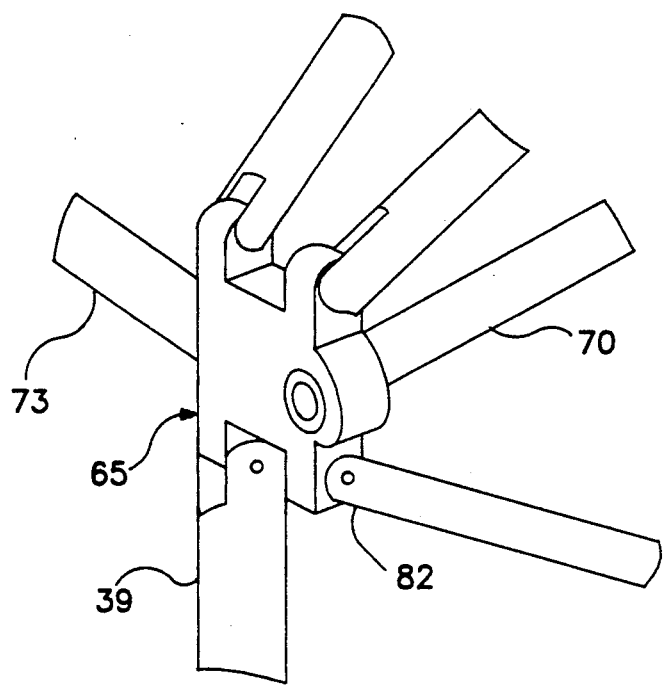
FIG. 2 is a detail of a portion of the invention.

A mast 10 according to this invention is shown in FIG. 1. It is constructed as pairs of adjacent bays. The elements of each pair of bays interact in the course of deployment and of retraction. There is no reaction between bays of adjacent pairs, other than that they are connected to one another.

The mast is mounted on some kind of base 11 such as a vehicle, spacecraft, or even a prepared foundation. Its nature is of no importance to this invention other than that it locates and anchors the mast.

The lower pair 15 of bays, bays 16,17 are shown in the deployed configuration. The upper pair 20 of bays 21,22 are shown in a partly deployed or partly retracted configuration. At the outset it will be observed that as shown the lower bays have a rectangular configuration, while the upper bays have a rhomboid configuration.

Because the pairs of bays are identical, only lower pair 15 will be described in detail. There may be any number of pairs, sometime only one. If more than two are used, they will be connected to successive pairs of bays.

When deployed, the structure will have four longerons 30,31,32,33 which extend parallel to axis 34. These are jointed and comprise longeron elements in connected pairs 35,36; 37,38; 39,40; and 41,42.

To the base there are fixed four lugs 43,44,45,46 one respective to each longeron. Lower ones of the longeron elements are pivotally connected to respective lugs so as to hinge in the plane of faces 47,48 which are partially framed by elements 35,37 and 39,41. Base frame elements 50,51,52,53 are connected to the lugs so as to form a rigid square frame.

Square frame elements 55,56,57,58 are joined to lugs 60,61,62,63 to which the next upper longeron elements 36,38,40 and 42 are pivotally connected, also to pivot in the planes of faces 47 and 48.

Lugs 65,66,67 and 68 pivotally engage the upper ends of the upper longeron elements and also square frame elements 70,71,72,73.

In the faces partially framed by pairs of longerons 30,33, and 31,32 are rigid braces 75,76,77,78. These are rigidly attached to the respective longeron elements and form these faces as rigid structure in all configurations. All active movement is in the other two faces 47 and 48.

To enable movement, hinged diagonals 80,81,82,83 are provided. These are rigid elements, and when fixed will prevent change of shape of faces 47 and 48.

Accommodation is made by the use of sliders 90,91 which fit over and slide along square frame elements 55 and 57. The hinged diagonals are hinged to their respective slider and to lugs 43,46,65 and 68.

As can be seen from an examination of FIG. 1, movement between the retracted and the deployed configuration involves sliding of the slider along the square frame elements to enable the longeron elements to form a rhombus in the two faces subject to change in shape, 47 and 48. Change of configuration is possible when the slider can slide, but not when it is latched.

Figure 3:
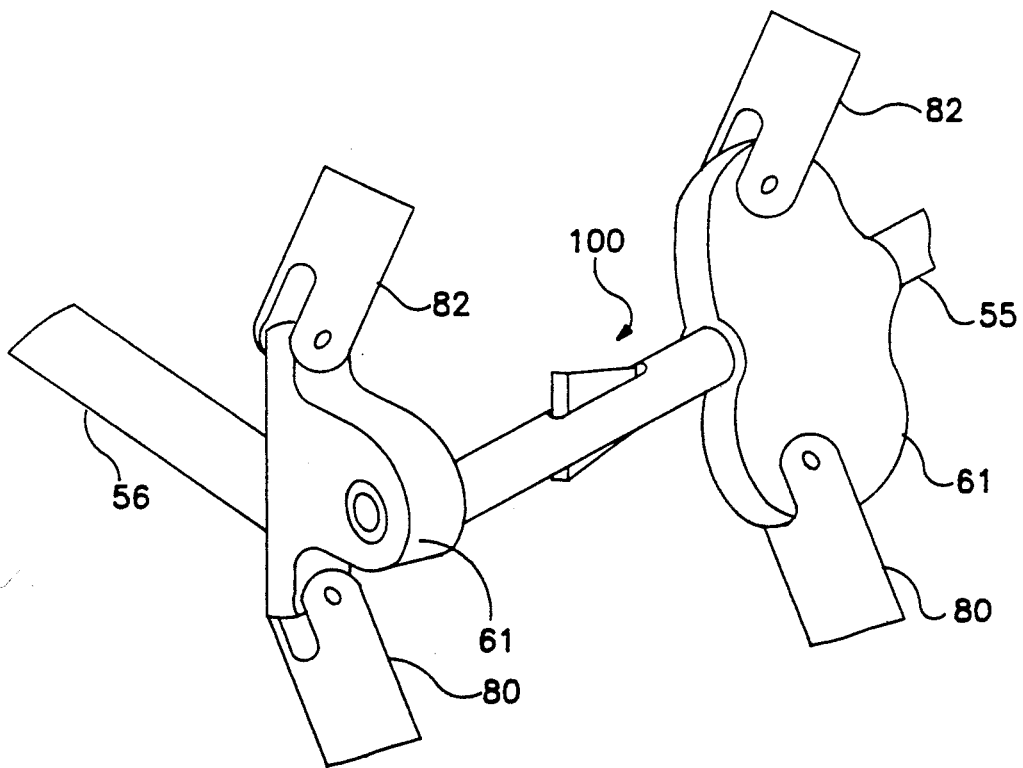
FIG. 3 is a detail of another portion of the invention.
Figure 4:
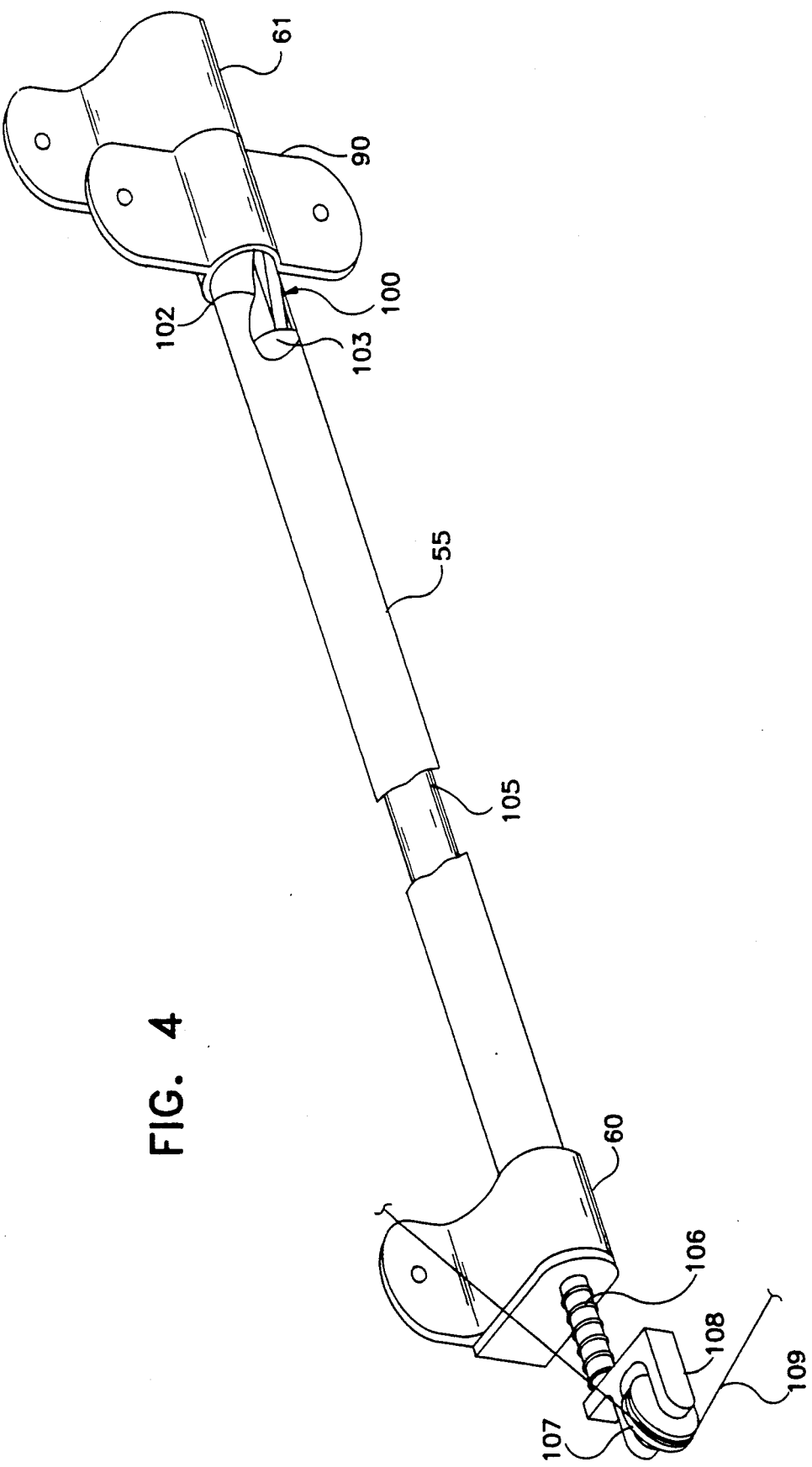
FIG. 4 is yet another detail of another portion of the invention.

To hold the mast in its deployed condition, latches 100,101 are provided for each slider (see FIGS. 3 and 4). They are identical. Therefore only latch 100 will be described in detail. As shown in FIGS. 3 and 4 square frame element 55 is a hollow tube. A catch 102 is spring-loaded out through a notch 103 in the wall of tubing 55 so as to engage the slider at the end of its travel in the deployed condition. This is an "umbrella" type of catch, and automatically latches when the slider is moved past it by springing outwardly into its path. While being deployed, the slider slides over the tapered latch to retract it in the element.

To enable release of the catch and consequent retraction of the mast, a retractor tube 105 is fitted inside the frame element. This tube is adapted to be pressed over the catch to retract it, and is biased away from the catch by spring 106 so as to leave it able to latch the slider. A pulley 107 is mounted to a fitting 108 on the tube, over which a lanyard 109 is run. A matching lanyard 110 is run over the other side of the mast structure in a similar way.

The lanyards pass over successive pulleys (and latches) and finally are connected to the topmost structural element. It will now be seen that pulling on the lanyards will both release the latches and pull the top of the mast downwardly so it progresses to the retracted (stored) configuration. The lanyard will be payed out to enable deployment of the mast.

Extension of the mast may be by any desired means. Means for this purpose are well-known and the details form no part of the invention. For this reason they are not specifically disclosed. One known system is to power or to spring load the joints between the adjacent pivotally mounted longeron elements. Retraction will be in opposition to their deployment forces. They inherently tend to deploy the device.

Figure 5:
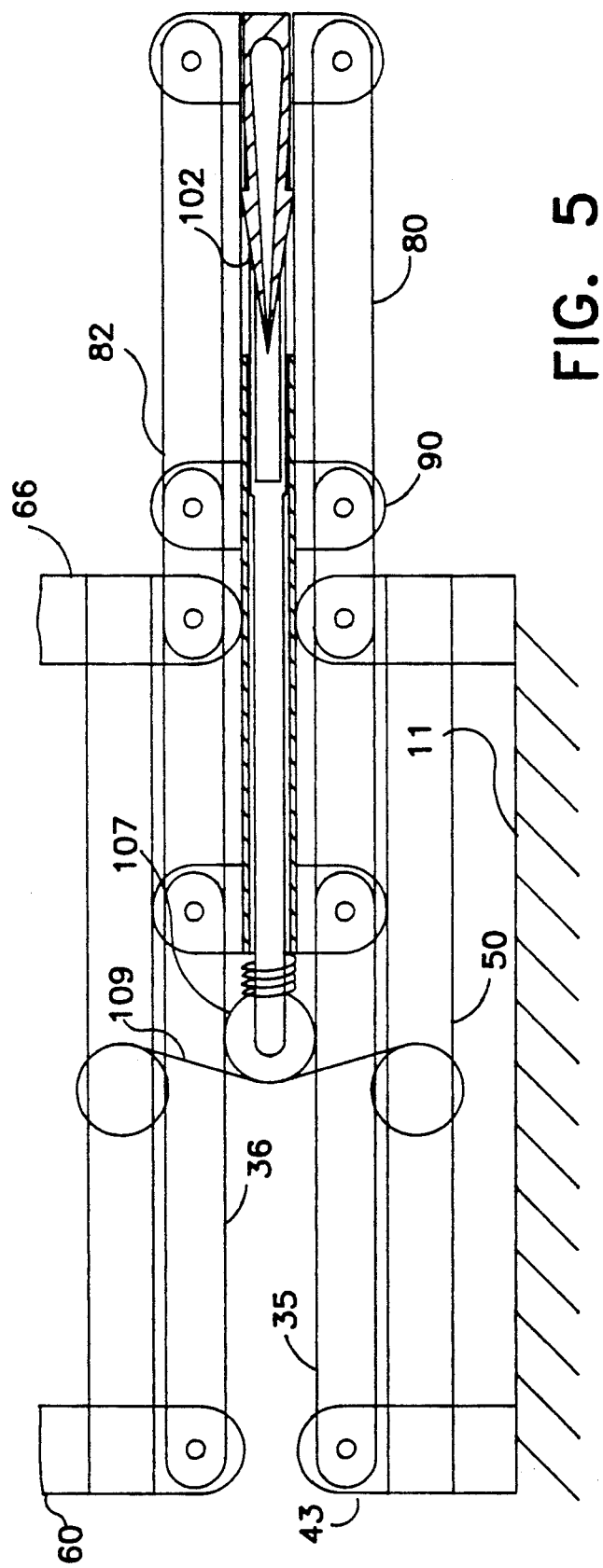
FIG. 5 is a side view, partly in schematic notation, showing the elements of one face of a pair of bays in the retracted configuration.
Figure 6:
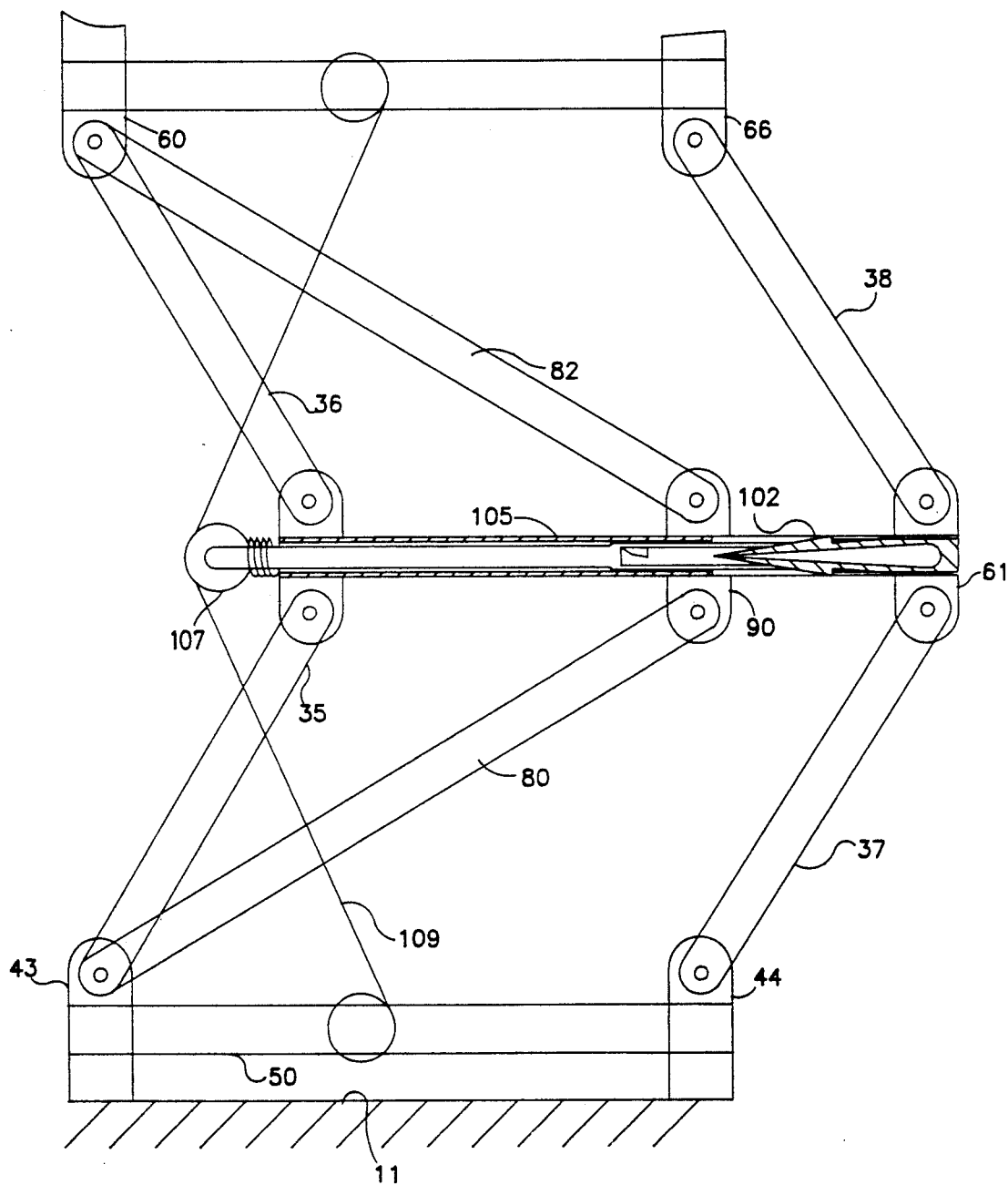
FIG. 6 is a side view of the elements of FIG. 5 in the transition configuration.
Figure 7:
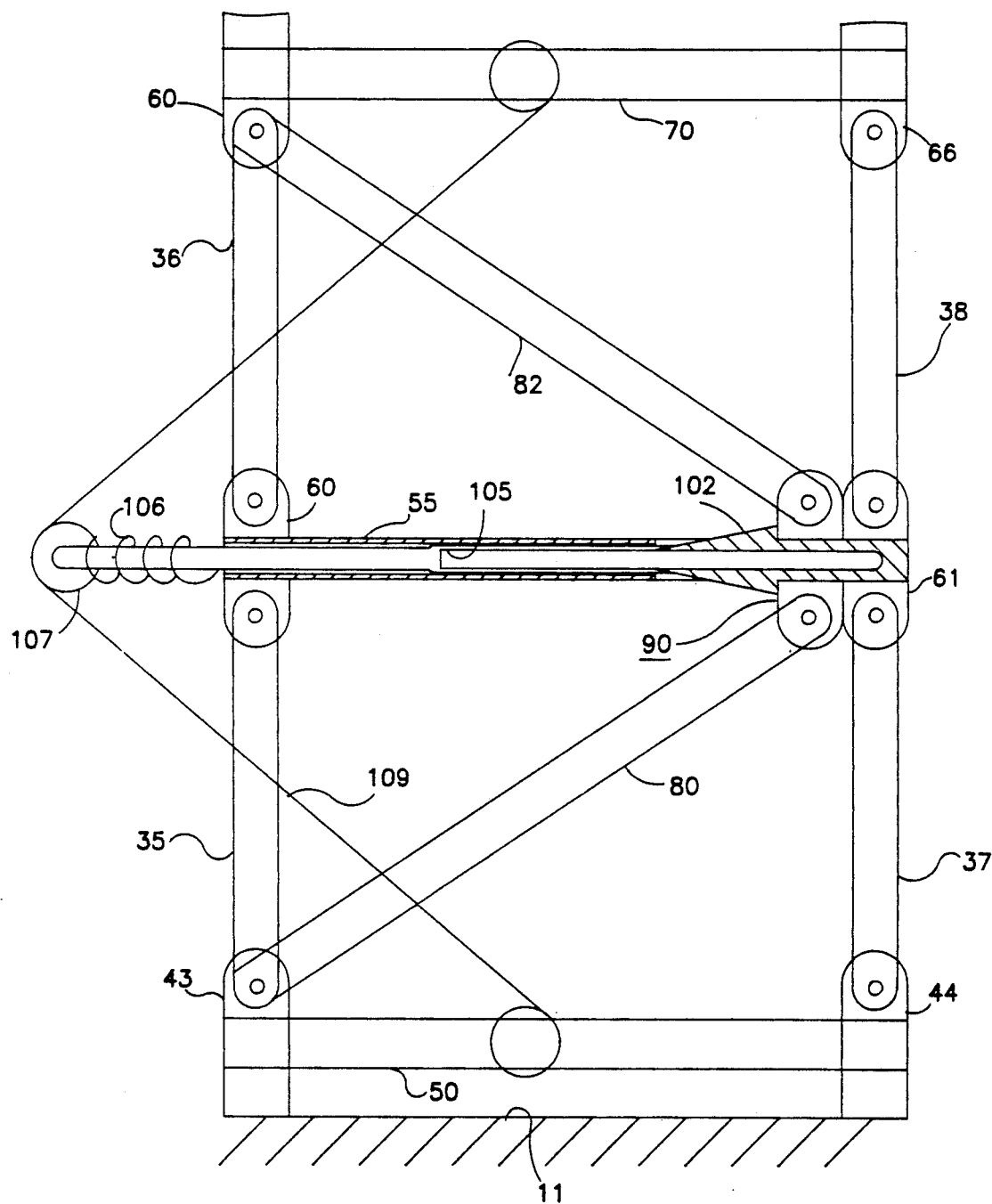
FIG. 7 is a side view of the elements of FIG. 5 in the deployed configuration.

FIGS. 5,6 and 7 show the progression of one pair of bays from retraction (FIG. 5) through transition (FIG. 6) to deployment (FIG. 7). These illustrations are partly in schematic notation so as to emphasize the movements. For more precise details, reference should be had to FIGS. 1-4.

Thus there has been described a mast which when deployed is made entirely of rigidly engaged structural elements. No cables or flexible devices are needed to maintain the integrity of the configuration. It is simply a locked-together assembly. If its elements are resistant to untoward events, it will survive. Survival of this type can be provided with the use of such rigid members, but not to the inventor's knowledge with flexible ones.

The only flexible element is the lanyard and such means as are provided to power the deployment, such as powered hinges. In the event of a severe heat experience, the lanyard and the power means will probably be destroyed. However, the mast will remain in place and useful, which is the objective of this invention. While the lanyard exists (or if it survives) the retraction feature will continue to exist.

The materials of construction for the rigid elements will be selected for their resistance to the untoward conditions that possibly may be experienced, such as blasts of high temperature, or nearby overheated equipment. The presently preferred material is carbon-carbon.

Carbon-carbon is made from layers of graphite fiber cloth that are bonded together by means of a phenolic pre-preg. This material is then carbonized by various proprietary processes of others to form a carbon graphite woven cloth held together by nearly pure carbon. This unique material has high strength, low weight, and excellent thermal stability and high temperature survivability.

Because carbon-carbon is a woven laminated material, and is not homogenous in the sense of a metal such as aluminum ' steel, consideration must be given to grain direction. There is good strength along the plies, but poor strength between them. Thus, when making the parts such as the longerons and fittings, the designer will lay up the material so that the strength of the plies is provided along the lines of intended stress.

The various tubes and fittings can be made with fins and other structures for attachment, all of which are well within the skills of a designer aware of the state of the art.

This invention is not to be limited by the embodiment shown in the drawings and described in the description, which is given by way of example and not of limitation, but only in accordance with the scope of the appended claims.

I claim:

1. A mast which is deployable and retractable, said mast when deployed having an axis, and whose structural elements are rigid, said mast comprising:

four longerons, each said longeron comprising a first and a second longeron element, said elements being pivotally joined together, and said longerons being pivotally mounted, so that pivoting movement can occur only in one pair of parallel spaced apart faces partially framed by two different pairs of said longerons;

a first square frame member comprising an assembly of four rigid square frame elements joined to one end of the first longeron element of each longeron at each intersection of two of said square frame members;

a second square frame member comprising an assembly of four rigid square frame elements joined at one end of each of the first and second longeron elements at their joinder, at each intersection of two of said square frame elements;

a third square frame member comprising an assembly of four rigid square frame elements joined at one end of each of said second longeron elements at each intersection of two of said square frame elements;

a rigid N frame member interconnecting the upper and lower ends of adjacent said first longeron elements and the upper and lower ends of said second longeron elements, in faces normal to the plane in which said longeron elements can pivot;

a slider slidable on each square frame element in said second square frame which lies parallel to the faces in which said longeron elements can pivot;

a first and a second rigid diagonal element pivotally connected to each of said sliders, and to one of said longerons, whereby said slider can move along said square frame element to enable said diagonal element to pivot in its respective said face;

latch means so disposed and arranged as to restrain said sliders from movement along the respective square frame element when the mast is in its deployed configuration, said latch means comprising a catch and a release member to retract said catch; and lanyard means to actuate said release member to release the catch to enable the mast to be pulled toward its retracted configuration.

2. A mast according to claim 1 in which said sliders fit as a sleeve on their respective square frame element, and in which said catch is an umbrella-type springy catch extendible through a notch in said square frame element to engage the slider, and in which said release member comprises a longitudinally movable body inside said square frame element adapted to contact and retract said catch when moved longitudinally, and in which said release member carries a pulley, said lanyard means passing over said pulley so as to move the release means to release said catch when the lanyard is pulled.

3. A mast according to claim 2 in which said lanyard is also connected to an uppermost one of said square frame members, whereby pulling on the lanyard also pulls the mast toward its retracted condition while releasing the latch means.

4. A mast according to claim 1 in which lugs interconnect said square frame elements, longerons, and N frame members; all of said square frame members, longerons, N frame members and sliders being made of high temperature resistant material whereby said mast when deployed is survivable as against a high temperature event.

5. A mast according to claim 4 in which said material is carbon-carbon.

6. A mast according to claim 4 in which said sliders fit as a sleeve on their respective square element, and in which said catch is an umbrella-type springy catch extendible through a notch in said square frame element to engage the slider, and in which said release member comprises a longitudinally movable body inside said square frame element adapted to contact and retract said catch when moved longitudinally, and in which said release member carries a pulley, said lanyard means passing over said pulley so as to move the release means to release said catch when the lanyard is pulled.

7. A mast according to claim 6 in which said lanyard is also connected to an uppermost one of said square frame members, whereby pulling on the lanyard also pulls the mast toward its retracted condition while releasing the latch means.

8. A mast according to claim 6 in which force means exerts a force on said mast tending to deploy it, said force being overcome by said lanyard when the mast is being retracted.

9. A mast according to claim 8 in which said material is carbon-carbon.

* * * * *